US012344295B2

(12) United States Patent
Fan et al.

(10) Patent No.: US 12,344,295 B2
(45) Date of Patent: Jul. 1, 2025

(54) PERMANENT-MAGNET MAGNETIC LEVITATION RAIL TRANSIT CONTROL SYSTEM BASED ON 5G COMMUNICATION TECHNOLOGY

(71) Applicant: JIANGXI UNIVERSITY OF SCIENCE AND TECHNOLOGY, Ganzhou (CN)

(72) Inventors: Kuangang Fan, Ganzhou (CN); Wenshuai Wang, Ganzhou (CN); Bin Yang, Ganzhou (CN); Pingchuan Liu, Ganzhou (CN); Jie Yang, Ganzhou (CN); Yuhang Chen, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 843 days.

(21) Appl. No.: 17/626,585

(22) PCT Filed: Jul. 8, 2020

(86) PCT No.: PCT/CN2020/100836
§ 371 (c)(1),
(2) Date: Jan. 12, 2022

(87) PCT Pub. No.: WO2021/082521
PCT Pub. Date: May 6, 2021

(65) Prior Publication Data
US 2022/0315076 A1    Oct. 6, 2022

(30) Foreign Application Priority Data

Oct. 31, 2019  (CN) .................. 201911049297.X

(51) Int. Cl.
*B61L 27/70*   (2022.01)
*B61L 15/00*   (2006.01)
(Continued)

(52) U.S. Cl.
CPC .......... *B61L 27/70* (2022.01); *B61L 15/0027* (2013.01); *B61L 15/0054* (2013.01);
(Continued)

(58) Field of Classification Search
CPC .......... B61L 27/70; B61L 27/00; B61L 27/20; B61L 2205/00; B61L 2210/04;
(Continued)

(56) References Cited

U.S. PATENT DOCUMENTS 6,782,044 B1 * 8/2004 Wright ...................... H04L 1/20
714/704
10,841,854 B2 * 11/2020 Wong .................... H04W 72/27
(Continued)

FOREIGN PATENT DOCUMENTS

CN    102036333 A      4/2011
CN    102413520 A  *  4/2012
(Continued)

OTHER PUBLICATIONS

Yu et al. "An Optimized Seamless Dual-Link Handover Scheme for High-Speed Rail", Dec. 17, 2015, IEEE.
(Continued)

*Primary Examiner* — Zachary L Kuhfuss
*Assistant Examiner* — James William Jones
(74) *Attorney, Agent, or Firm* — WPAT, PC

(57) ABSTRACT

Disclosed in the present invention are a permanent-magnet magnetic levitation rail transit control system and method based on 5G communication technology. The system comprises: an intelligent control center, a 5G communication platform, a train security system, an Internet of things monitoring system, and a passenger service system. In the present invention, targeted at the problem of being difficult to ensure barrier-free transmission of signals even by means of beamforming technology due to high moving speed of a
(Continued)

permanent-magnet magnetic levitation rail transit system and small coverage of 5G base stations, a multi-connectivity scheme is used, and the intelligent control center selects two 5G base stations for signal transmission at the same time depending on distribution of 5G base stations along a line, wherein one 5G base station is the current closest base station, and the other 5G base station is the next base station to be approached. By means of a relay-type base station passing mode, it is ensured that a 5G communication platform can provide a stable and reliable communication link.

8 Claims, 3 Drawing Sheets

(51) Int. Cl.

| | | |
|---|---|---|
| *B61L 27/00* | (2022.01) | |
| *B61L 27/20* | (2022.01) | |
| *E01B 25/30* | (2006.01) | |
| *E01F 13/04* | (2006.01) | |
| *H04W 36/30* | (2009.01) | |
| *H04W 4/42* | (2018.01) | |
| *H04W 36/00* | (2009.01) | |
| *H04W 84/00* | (2009.01) | |
| *H04W 84/04* | (2009.01) | |

(52) U.S. Cl.
CPC ....... *B61L 15/0058* (2024.01); *B61L 15/0072* (2013.01); *B61L 27/00* (2013.01); *B61L 27/20* (2022.01); *E01B 25/30* (2013.01); *E01F 13/04* (2013.01); *H04W 36/304* (2023.05); *B61L 2205/00* (2013.01); *B61L 2210/04* (2013.01); *H04W 4/42* (2018.02); *H04W 36/00222* (2023.05); *H04W 84/005* (2013.01); *H04W 84/042* (2013.01)

(58) Field of Classification Search
CPC ............ B61L 15/0027; B61L 15/0054; B61L 15/0072; B61L 15/0058; E01B 25/30; E01F 13/04; H04W 36/304; H04W 36/00222; H04W 84/042; H04W 84/005; H04W 4/42
USPC ...................................... 246/473 R
See application file for complete search history.

(56) References Cited

U.S. PATENT DOCUMENTS

| | | | |
|---|---|---|---|
| 11,284,233 B2* | 3/2022 | Kraeling | B61L 15/0027 |
| 2017/0070436 A1* | 3/2017 | Lubenski | H04W 28/0205 |
| 2017/0272931 A1* | 9/2017 | Bottari | H04W 4/42 |

FOREIGN PATENT DOCUMENTS

| | | | | |
|---|---|---|---|---|
| CN | 103067995 A | | 4/2013 | |
| CN | 103916918 A | | 7/2014 | |
| CN | 104580295 A | | 4/2015 | |
| CN | 106131902 A | | 11/2016 | |
| CN | 106341852 A | * | 1/2017 | |
| CN | 106926871 A | | 7/2017 | |
| CN | 107613539 A | | 1/2018 | |
| CN | 108645451 A | | 10/2018 | |
| CN | 108901050 A | * | 11/2018 | ........ H04W 36/0083 |
| CN | 109343425 A | | 2/2019 | |
| CN | 110012514 A | | 7/2019 | |
| CN | 110247680 A | * | 9/2019 | ........... H04B 10/116 |
| CN | 110264716 A | * | 9/2019 | |
| CN | 110281985 A | * | 9/2019 | ............. B61B 13/08 |
| CN | 110493853 A | | 11/2019 | |
| CN | 110667655 A | | 1/2020 | |
| WO | WO-2018233805 A1 | * | 12/2018 | .......... B61L 15/0027 |
| WO | WO-2019074242 A1 | * | 4/2019 | .......... B61L 15/0027 |
| WO | WO-2019120501 A1 | * | 6/2019 | ............. H04W 16/12 |

OTHER PUBLICATIONS

Pan et al. "RBC Handover Model Based on Train Subjectivity" Journal of Transportation Systems Engineering and Information Technology, Aug. 2013 Tongji University, Shanghai, China.

Feng "Research on Handover Performance Improvement Scheme in Heterogeneous Networks in High-speed Environment", Dec. 16, 2018, Chinese Master's Theses Full-text Database, Engineering Science and Technology II.

Tian et al. "Seamless Dual-Link Handover Scheme in Broadband Wireless Communication Systems for High-Speed Rail", May 2012, IEEE Journal on Areas In Communications, vol. 30, No. 4, IEEE.

China Patent Office "search report for 201911049297.X", Feb. 3, 2021, China.

China Patent Office "search report for PCTCN2020100836", Oct. 12, 2020, China.

China Patent Office "supplementary search report for 201911049297. X", Jun. 18, 2021, China.

* cited by examiner

PERMANENT-MAGNET MAGNETIC LEVITATION RAIL TRANSIT CONTROL SYSTEM BASED ON 5G COMMUNICATION TECHNOLOGY

FIELD OF THE INVENTION

The present invention relates to the technical field of control of permanent-magnet maglev rail transit, in particular to a permanent-magnet maglev rail transit control system and a method.

BACKGROUND OF THE INVENTION

In recent years, the fifth-generation mobile communication system (5G) has become a hot spot discussed by the communication industry and the academic circle. With the development of the mobile Internet, more and more devices get access to the mobile network, and new services and applications emerge one after another. The quantity of global mobile broadband users is expected to reach 9 billion in 2018, and the capacity required for mobile communication networks is expected to be increased by 1000 times in 2020 based on the capacity of the existing networks. The explosion of mobile data traffic will bring severe challenges to the networks. First, according to the current development of the mobile communication networks, the capacity is hard to meet the requirements of thousandfold increase of the data traffic and difficult to bear network energy consumption and bit cost. Second, increase of the data traffic inevitably brings further demand for spectrum; however, the spectrum is hard to be used efficiently due to the scarcity and large-span fragmented distribution of available spectrum. In addition, network sources have to be utilized efficiently to increase the capacity of the networks, for example, services and users' personalities can be intelligently optimized, but the ability in this aspect is insufficient. Last, in future, a network must be a heterogeneous mobile network where various networks coexist, and therefore, to increase the capacity of the networks, all networks should be efficiently managed, mutual operation should be simplified, and user experience should be improved. In order to solve the above challenges and meet the ever-growing demand for mobile traffic, a new-generation mobile communication network 5G is to be developed urgently.

A permanent-magnet maglev train is safe, reliable, low in operation and maintenance, weatherproof, punctual, low in noise and slight in vibration, so it is an inevitable choice for the next generation of high-speed ground transport tools. Existing maglev technologies can be briefly divided into electromagnetic levitation (normal-conducting), superconducting maglev and permanent-magnet maglev. Electromagnetic levitation includes the Changsha maglev line (China's own technology) and the Shanghai maglev line (German technology); the Yamanashi line in Japan is considered as the typical example of superconducting maglev; and permanent-magnet maglev is typically characterized by "zero power" levitation, but is difficult to process. In recent years, with rapid development of technologies such as permanent magnetic materials, electronic information and precision machining, the permanent-magnet maglev technology attracts extensive attention of the industry again.

A permanent-magnet maglev train moves fast, has a large carrying capacity and works in a complicated electromagnetic environment. Therefore, when applied to the permanent-magnet maglev train, a traditional communication technology may suffer from problems such as poor signal quality, high communication delay, low data transmission quality and unstable communication, which not only seriously affects the passengers' experience while taking the train, and also poses a great challenge for safe, reliable and stable running of the train. The 5G technology has the advantages of fast transmission, large traffic density, high connection quantity, short aerial delay, high spectrum efficiency and good mobility performance. However, there are few researches and applications related with 5G in the field of rail transit at present. Therefore, it has a great significance on normal and safe running of a permanent-magnet maglev rail transit system and development of the national maglev rail transit by researching a new generation of maglev train running control system and introducing the 5G technology into the permanent-magnet maglev rail transit system based on deep integration of emerging technologies such as compound sensors, embedded systems, Internet of Things, cloud computation, big data and artificial intelligence.

SUMMARY OF THE INVENTION

To make up the shortcomings of the prior art, the present invention aims to provide a permanent-magnet maglev rail transit control system and method based on a 5G communication technology. The 5G communication technology is creatively introduced to the permanent-magnet maglev rail transit system. Compared with a traditional communication way, the 5G communication technology can greatly improve the end-to-end delay of data transmission, the peak rate of transmission, the connection density, etc.

In order to achieve the above aim, the present invention adopts the following technical solution.

A permanent-magnet maglev rail transit control system based on a 5G communication technology,
  comprising an intelligent control center and a 5G communication platform, wherein the intelligent control center comprises an electrical control system, a data exchange device, a communication device and a central server; the electrical control system and the data exchange device is in communication connection with the central server; the central server is in communication connection with the communication device; the electrical control system is mainly configured to drive a permanent-magnet maglev train to run according to instructions of the central server; the data exchange device comprises a data storage array, a data management unit and an input and output interface; the data storage array is used for data storage, and is connected with the data management unit through the input and output interface; the data management unit is in communication connection with the central server; the data management unit is configured to select corresponding data from the data storage array according to a request of the central server and transmit the corresponding data to the central server;
  the 5G communication platform comprises a 5G base station and a train communication support unit; the 5G base station is arranged along a running route of the permanent-magnet maglev train; the train communication support unit comprises a front-end communication module, a back-end communication module, a controller and a WiFi transmission module; the front-end communication module, the back-end communication module and the WiFi transmission module are in communication connection with the controller; the controller is in communication connection with the central server; the front-end communication module and the back-end communication module are separately installed at a front end and a tail end of the permanent-magnet maglev train; each compartment of the permanent-magnet maglev train is provided with the WiFi transmission module; the communication device is in communication with the 5G base station; and the 5G base station is connected to an external Ethernet to provide a wireless communication service, and services such as installation of the 5G base station are provided by operators; in the train communication support unit, the controller is configured to acquire a current running position of the permanent-magnet maglev train from the central server, control the back-end communication module to be in communication connection with a current nearest 5G base station according to the current running position of the permanent-magnet maglev train and the installation position of the 5G base station, and control the front-end communication module to be in communication connection with a next approaching 5G base station; when the permanent-magnet maglev train gradually leaves away from the nearest 5G base station and gets close to the next 5G base station, signals received by the back-end communication module gradually become weaker, while signals received by the front-end communication module gradually become stronger; when the controller detects that the signals received by the back-end communication module are weaker than that received by the front-end communication module, that is, the 5G base station connected with the front-end communication module becomes the current nearest 5G base station, the controller controls the back-end communication module to disconnect the communication connection from the original 5G base station and to be in communication connection with the 5G base station connected with the front-end communication module; when the controller monitors that the back-end communication module is in stable connection with the current nearest 5G base station, the front-end communication module is controlled to be disconnected from the current connected 5G base station and is controlled to be connected with an approaching 5G base station of the permanent-magnet maglev train according to the current running position of the permanent-magnet maglev train and the installation position of the 5G base station; and the WiFi transmission module is in communication connection with the controller to transmit WiFi signals so as to provide wireless communication signals for passengers and equipment in each compartment.

The permanent-magnet maglev rail transit control system based on a 5G communication technology further comprises a train security system, wherein the train security system comprises a face recognition unit, an in-station monitoring unit, an object detection unit, a communication unit and an alarming unit; the face recognition unit, the in-station monitoring unit, the object detection unit and the alarming unit are in communication connection with the communication unit; the communication unit is in communication connection with the 5G base station; the face recognition unit is configured to acquire face information of passengers and send the face information to the central server through the communication unit so as to realize real-time online face recognition, and the central server sends an instruction about whether the passengers are allowed to pass or not to the face recognition unit according to recognition results; the object detection unit is configured to detect baggage and belongings of passengers and send detection information to the central server through the communication unit, and the central server identifies whether there are dangerous objects or suspicious objects or not; when the central server discovers that there are dangerous objects or suspicious objects, the communication device sends an alarm control signal to the alarming unit, and the alarming unit gives an alarm; and the in-station monitoring unit is configured to monitor the behaviors of people on a platform and send monitoring information to the central server through the communication unit, the central server judges whether there are unsafe, uncivilized or illegal criminal behaviors or not, and if so, the central server sends an alarm control signal to the alarming unit through the communication device, and the alarming unit gives an alarm.

Further, the face recognition unit comprises a high-definition camera and a pass gate; the high-definition camera and the pass gate are both in communication connection with the communication unit; the high-definition camera is configured to acquire the face information of passenger and send the face information to the central server in real time through the communication unit, and the central server extracts face features in real time; the central server compares the extracted face features with face features, pre-stored in the data exchange device, of the passengers taking this train; and if the extracted face features match the face features pre-stored in the data exchange device, the passenger is considered to have ordered the ticket of this train, then the central server sends a pass instruction to the pass gate through the communication device, and the pass gate is opened after receiving the pass instruction to allow the passenger to pass.

Further, the object detection unit comprises an X-ray imager and a metal detecting gate; the X-ray imager and the metal detecting gate are in communication connection with the communication unit, respectively; the X-ray imager is configured to detect the baggage of the passengers and transmit the detected images to the central server through the communication unit; the central server extracts features from the detected images, picks pre-stored features of dangerous objects and suspicious objects from the data storage array through the data management unit and compares the pre-stored features with the extracted features; when a dangerous object or a suspicious object is discovered, the central server sends an alarm control signal to the alarming unit through the communication device, and the alarming unit gives an alarm; when a passenger passes through the metal detecting gate, the metal detecting gate detects whether the passenger carries a metal object or not and transmits information of the detected metal object to the central server, the central server picks pre-stored information of the dangerous objects and suspicious objects from the data storage array through the data management unit and matches the pre-stored information with the information of the detected metal object; and when a dangerous object or a suspicious object is discovered, the central server sends an alarm control signal to the alarming unit through the communication device, and the alarming unit gives an alarm.

Further, the in-station monitoring unit comprises a surveillance camera, a limiting module and a warning module; the surveillance camera is in communication with the communication unit; the limiting module is in communication connection with the warning module; the surveillance camera is configured to monitor the platform and transmit surveillance information to the central server through the communication unit; the central server analyzes the behaviors of people in the station; when people in the station have unsafe, uncivilized or illegal criminal behaviors, the central server sends an alarm control signal to the alarming unit through the communication device, and the alarming unit gives an alarm; the limiting module is distributed at a position where a solid handrail is inconvenient to arrange on the platform of the permanent-magnet maglev train, and is configured to limit positions of the passengers when the passengers are waiting for the train on the platform; and when the passengers get close to the limiting module, the warning module gives a warning to remind the passengers of leaving away.

The permanent-magnet maglev rail transit control system based on the 5G communication technology further comprises an Internet of Things monitoring system, wherein the Internet of Things monitoring system comprises a levitation height monitoring module, a running position monitoring module, a running speed monitoring module, a fire safety monitoring module and a networking module; the running speed monitoring module and the running position monitoring module are in communication with the 5G base station through the corresponding networking module; the levitation height monitoring module and the fire safety monitoring module are in communication with the WiFi transmission module through the corresponding networking module; the levitation height monitoring module, the running position monitoring module, the running speed monitoring module and the fire safety monitoring module are configured to monitor a levitation height, a running position, a running speed and a fire safety condition of the permanent-magnet maglev train respectively, and send monitoring information to the central server through the corresponding networking module; and the central server stores the monitoring information in the data storage array through the data management unit and monitors whether the permanent-magnet maglev train runs normally or not in real time according to the levitation height, the running position, the running speed and the fire safety condition.

The permanent-magnet maglev rail transit control system based on the 5G communication technology further comprises a passenger service system, wherein the passenger service system comprises a train service platform and a passenger service APP; the train service platform is mounted on each seat of the train and is in communication connection with the central server; the train service platform is configured to provide a human-computer interaction interface to provide train services for the passengers; the passenger service APP is mounted in a mobile device of a passenger and provides online services for the passenger; and meanwhile, when the in-station monitoring system monitors that a passenger has unsafe, uncivilized or illegal criminal behaviors on the platform, the central server acquires the information of the passenger service APP of the passenger according to recognized face information of the passenger, sends a corresponding notice or warning information to the mobile device of the passenger, and reminds the passenger of stopping the current unsafe, uncivilized or illegal criminal behaviors.

The present invention further provides a method utilizing the above permanent-magnet maglev rail transit control system based on the 5G communication technology, comprising the following steps:

after the permanent-magnet maglev rail transit control system based on the 5G communication technology is started normally, starting to drive a permanent-magnet maglev train to run according to an instruction of a central server by an electrical control system of an intelligent control center; and in a 5G communication platform, connecting a 5G base station to an external Ethernet to provide a wireless communication service; in a train communication support unit, by a controller, acquiring a current running position of the permanent-magnet maglev train from the central server, controlling a back-end communication module to be in communication connection with a nearest 5G base station according to the current running position of the permanent-magnet maglev train and an installation position of the 5G base station, and controlling a front-end communication module to be in communication connection with a next approaching 5G base station; when the permanent-magnet maglev train gradually leaves away from the nearest 5G base station and gets close to the next 5G base station, receiving gradually weaker signals by the back-end communication module, while receiving gradually stronger signals by the front-end communication module; when the controller detects that the signals received by the back-end communication module are weaker than that received by the front-end communication module, that is, the 5G base station connected with the front-end communication module becomes the current nearest 5G base station, by the controller, controlling the back-end communication module to disconnect the communication connection from the original 5G base station and controlling the back-end communication module to be in communication connection with the 5G base station connected with the front-end communication module; when the controller monitors that the back-end communication module is in stable connection with the current nearest 5G base station, controlling the front-end communication module to be disconnected from the current connected 5G base station and controlling the front-end communication module to be connected with the approaching 5G base station of the permanent-magnet maglev train according to the current running position of the permanent-magnet maglev train and the installation position of the 5G base station; and making the WiFi transmission module be in communication connection with the controller to transmit WiFi signals so as to provide wireless communication signals for passengers and equipment in each compartment.

The method further comprising: before the train runs, by using a train security system, performing recognition and security check for passengers who are entering a platform and performing security monitoring on behaviors of the passengers on the platform; by a face recognition unit, acquiring face information of passenger and sending the face information to the central server through a communication unit so as to realize real-time online face recognition, and sending an instruction about whether the passengers are allowed to pass or not to the face recognition unit by the central server according to recognition results; by an object detection unit, detecting baggage and belongings of the passenger and transmitting detection information to the central server through the communication unit, and identifying whether there are dangerous objects or suspicious objects or not by the central server; when the central server discovers that there are dangerous objects or suspicious objects, sending an alarm control signal to an alarming unit by the communication device, and giving an alarm by the alarming unit; by an in-station monitoring unit, monitoring behaviors of people on the platform and sending monitoring information to the central server through the communication unit, and judging whether there are unsafe, uncivilized or illegal criminal behaviors or not by the central server; and if so, by the central server, sending an alarm control signal to the alarming unit through the communication device, and giving an alarm by the alarming unit.

The method further comprising: during running of the train, monitoring running parameters of the permanent-magnet maglev train by using an Internet of Things monitoring system; specifically, in the Internet of Things monitoring system, by using a levitation height monitoring module, a running position monitoring module, a running speed monitoring module and a fire safety monitoring module, monitoring a levitation height, a running position, a running speed and a fire safety condition of the permanent-magnet maglev train respectively, and sending monitoring information to the central server through a corresponding networking module; by the central server, storing the monitoring information in a data storage array through a data management unit and monitoring whether the permanent-magnet maglev train runs normally or not in real time according to the levitation height, the running position, the running speed and the fire safety condition; and before the train runs or during running of the train, using a passenger service system to provide services for the passengers, wherein each seat of the train is provided with a train service platform, and the passengers select required train services through a human-computer interaction interface provided by the train service platform; the passenger service APP is mounted in mobile devices of the passengers, and the passengers are provided with required online services including online booking and arrival query of the train; and meanwhile, when the in-station monitoring system monitors that a passenger has unsafe, uncivilized or illegal criminal behaviors on the platform, the central server may acquire the information of the passenger service APP of the passenger according to recognized face information of the passenger, send a corresponding notice or warning information to the mobile device of the passenger, and remind the passenger of stopping the current unsafe, uncivilized or illegal criminal behaviors.

The present invention has the following beneficial effects:
1. A permanent-magnet maglev rail transit system moves fast, but 5G base stations just cover a small range. Therefore, it is hard to guarantee non-breaking transmission of signals even after a beamforming technology is adopted. The present invention adopts a multi-connection scheme, and an intelligent control center simultaneously selects two 5G base stations for signal transmission based on the distribution of the 5G base stations of the route. One 5G base station is considered as a current nearest base station, and the other one is considered as a next approaching base station. Therefore, it is ensured that a 5G communication platform may provide a stable and reliable communication link through a relay type base station transmission way.
2. Great improvement of passengers' experience while taking a train is realized. Passengers can be provided with high-speed stable network services through the 5G communication platform. The current situation about weak signals and unstable connection of a traditional train is changed. The passengers are provided with an optimal communication network according to a dynamic and intelligent base station allocation rule. Therefore, the experience of taking a train is greatly improved, and the network is not affected when the passengers take a train.
3. The system adopts a cloud control technology. An intelligent control center is arranged at the cloud. Each detection device is connected with the intelligent control center through quick and reliable 5G communication, and thus the requirements on performance of detection devices are reduced. The acquired data are uploaded to the cloud by the detection devices and do not need to be excessively analyzed. Therefore, the design cost is greatly lowered.
4. In the present invention, each sensor of an Internet of Things monitoring platform can realize real-time online running and can also realize public sharing of data through a high-speed and low-delay 5G network. Through the 5G communication platform, massive monitoring data are shared in other platforms of the system, so that all platforms of the system are organically connected in series to guarantee safe and stable running of the train. By virtue of the low-delay characteristic of the 5G communication platform, the timeliness of the monitoring data is greatly improved, and dangers are monitored in advance and prevented in time, so that the loss is reduced to the minimum, and high-efficiency running of the Internet of Things monitoring platform is realized. The Internet of Things monitoring platform is directly connected with the control center to realize intelligent processing of the monitoring data and predict the future trend of the monitoring data based on big data analysis.
5. It enables a security platform to realize intelligent running. By virtue of the high-speed 5G communication platform, the limitation of a traditional wireless communication way on resolution of surveillance cameras is avoided. A high-definition 4K camera is used to monitor the platform of the train and provide multi-dimensional face data for the control center, which greatly improves the accuracy of face recognition. By comparing passenger information of the train with the face data, intelligent ticket checking is realized, the labor cost is lowered, and the passing speed is increased. Meanwhile, passengers' behaviors are analyzed by virtue of real-time transmission of videos, thus early warning for passengers' dangerous behaviors can be performed to guarantee inviolability of passengers' personal and property safety.

DETAILED DESCRIPTION OF THE EMBODIMENTS

The present invention will be further described below in conjunction with the drawings. It should be noted that present embodiments are based on the technical solution and provides a specific implementation and a specific operation process. However, the protection scope of the present invention is not limited to the present embodiments.

Embodiment 1

Figure 1:
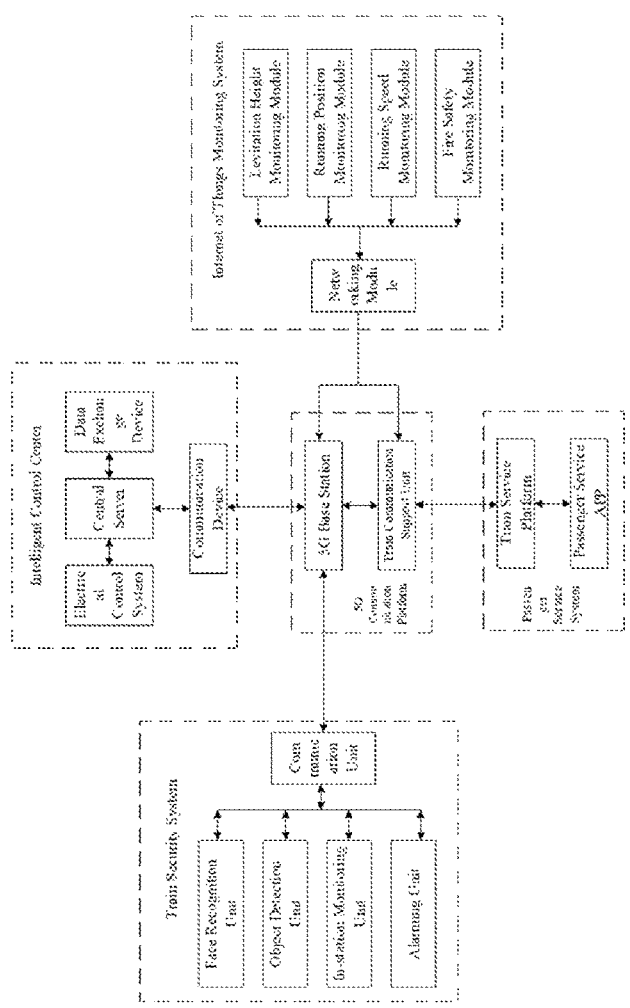
FIG. 1 is a structural schematic diagram of a system of Embodiment 1 of the present invention.

The present embodiment provides a permanent-magnet maglev rail transit control system based on a 5G communication technology. As shown in FIG. 1, the permanent-magnet maglev rail transit control system includes an intelligent control center and a 5G communication platform; and the intelligent control center includes an electrical control system, a data exchange device, a communication device and a central server; the electrical control system and the data exchange device are in communication connection with the central server; the central server is in communication connection with the communication device; the electrical control system is mainly configured to drive a permanent-magnet maglev train to run according to instructions of the central server; the data exchange device includes a data storage array, a data management unit and an input and output interface; the data storage array is used for data storage, and is connected with the data management unit through the input and output interface; the data management unit is in communication connection with the central server; and the data management unit is configured to select corresponding data from the data storage array according to a request of the central server and transmit the corresponding data to the central server.

It should be noted that the electrical control system includes a rectifying device, an inverter and a PLC module; the rectifying device is configured to convert 220V alternating current into direct current; the inverter is configured to invert the direct current obtained by the rectifying device into frequency-controllable alternating current, so that the running speed of the permanent-magnet maglev train is controlled by controlling the frequency; and the PLC module is in communication connection with the central server and is configured to orderly control the running of the permanent-magnet maglev train according to instructions of the central server.

The 5G communication platform includes 5G base stations and a train communication support unit; the 5G base stations are arranged along a running route of the permanent-magnet maglev train; the train communication support unit includes a front-end communication module, a back-end communication module, a controller and WiFi transmission modules; the front-end communication module, the back-end communication module and the WiFi transmission modules are all in communication connection with the controller; the controller is in communication connection with the central server; the front-end communication module and the back-end communication module are separately installed at a front end and a tail end of the permanent-magnet maglev train; each compartment of the permanent-magnet maglev train is provided with a WiFi transmission module; the communication device is in communication with the 5G base stations.

The 5G base stations are connected to an external Ethernet to provide a wireless communication service, and services such as installation of the 5G base stations are provided by operators; in the train communication support unit, the controller is configured to acquire the current running position of the permanent-magnet maglev train from the central server, control the back-end communication module to be in communication connection with the nearest 5G base station according to the current running position of the permanent-magnet maglev train and the installation positions of the 5G base stations, and control the front-end communication module to be in communication connection with the next approaching 5G base station; when the permanent-magnet maglev train gradually leaves away from the nearest 5G base station and gets close to the next 5G base station, signals received by the back-end communication module gradually become weaker, while signals received by the front-end communication module gradually become stronger; when the controller detects that the signals received by the back-end communication module are weaker than that received by the front-end communication module, that is, the 5G base station connected with the front-end communication module becomes the current nearest 5G base station, the controller controls the back-end communication module to be disconnect the communication connection from the original 5G base station and to be communication connection with the 5G base station connected with the front-end communication module; when the controller monitors that the back-end communication module is in stable connection with the current nearest 5G base station, the front-end communication module is controlled to be disconnected from the current connected 5G base station and is controlled to be connected with the approaching 5G base station of the permanent-magnet maglev train according to the current running position of the permanent-magnet maglev train and the installation positions of the 5G base stations; and the WiFi transmission modules are in communication connection with the controller to transmit WiFi signals so as to provide wireless communication signals for passengers and equipment in the compartments.

The train communication support unit of the present embodiment can effectively guarantee stable connection of the train communication by such alternating dynamic selection of the base stations and use of double communication modules. The controller selects the 5G base station with higher signal intensity. By a 5G base station signal acquired by the back-end communication module (or the front-end communication module), the train communication support unit is kept connected to the Ethernet all the time. Each WiFi transmission module is in communication connection with the controller and is distributed in the corresponding compartment. By the communication connection with the controller, each WiFi transmission module transmits a WiFi signal for passengers and equipment in the train to use, so that the equipment having no 5G communication function or the equipment having a 5G communication function which is unstable in communication due to an over-high speed or other causes in the train can be provided with a stable, reliable, low-delay and large-capacity 5G communication service.

Further, in the present embodiment, the permanent-magnet maglev rail transit control system based on the 5G communication technology further includes train security systems; each train security system includes a face recognition unit, an in-station monitoring unit, an object detection unit, a communication unit and an alarming unit; the face recognition unit, the in-station monitoring unit, the object detection unit and the alarming unit are all in communication connection with the communication unit; the communication unit is in communication connection with the 5G base stations; the face recognition unit is configured to obtain the face information of the passengers and send the face information to the central server through the communication unit so as to realize real-time online face recognition, and the central server sends an instruction about whether the passengers are allowed to pass or not to the face recognition unit according to recognition results; the object detection unit is configured to detect baggage and belongs of the passengers and send the detection information to the central server through the communication unit, and the central server identifies whether there are dangerous objects or suspicious objects or not; when the central server discovers that there are dangerous objects or suspicious objects, the communication device sends an alarm control signal to the alarming unit, and the alarming unit gives an alarm; and the in-station monitoring unit is configured to monitor the behaviors of people on a platform and send the monitoring information to the central server through the communication unit, the central server judges whether there are unsafe, uncivilized or illegal criminal behaviors or not, and if so, the central server sends an alarm control signal to the alarming unit through the communication device, and the alarming unit gives an alarm.

It should be noted that the train security systems (such as the face recognition units and the object detection units) are distributed at a station hall and the train security systems (such as the in-station monitoring units) are distributed at a platform, and the train security systems have different distances between each other, and therefore, there may be more than one alarming unit and communication unit; and specifically, one or more alarming units and communication units can be arranged according to the requirements of actual situations so as to achieve corresponding communication and alarming functions.

Further, each face recognition unit includes a high-definition camera and a pass gate; the high-definition camera and the pass gate are both in communication connection with the communication unit; the high-definition camera is configured to acquire the face information of the passengers and send the face information to the central server in real time through the communication unit, and the central server extracts face features in real time; the central server compares the extracted face features with the face features, pre-stored in the data exchange device, of a passenger taking this train; and the passenger is considered to have ordered the ticket of this train if the extracted face features match the face features pre-stored in the data exchange device, then the central server gives a pass instruction to the pass gate through the communication device, and the pass gate is opened after receiving the pass instruction to allow the passenger to pass. Due to the characteristics of low delay and large capacity, a 5G network can quickly and efficiently realize an overall process of face information transmission, recognition and sending of instructions.

Further, each object detection unit includes an X-ray imager and a metal detecting gate; the X-ray imager and the metal detecting gate are in communication connection with the communication unit, respectively; the X-ray imager is configured to detect the baggage of passengers and transmit detected images to the central server through the communication unit; the central server extracts features from the detected images, picks the pre-stored features of dangerous objects and suspicious objects from the data storage array through a data management unit and compares the pre-stored features with the extracted features; when a dangerous object or a suspicious object is detected, the central server sends an alarm control signal to the alarming unit through the communication device, and the alarming unit gives an alarm; when a passenger passes through a metal detecting gate, the metal detecting gate will detect whether the passenger carries a metal object or not and transmit the information of the detected metal object to the central server, the central server picks the pre-stored information of the dangerous objects and suspicious objects from the data storage array through the data management unit and compares the pre-stored information with the information of the detected metal object; and when a dangerous object or a suspicious object is detected, the central server sends an alarm control signal to the alarming unit through the communication device, and the alarming unit gives an alarm. Dangerous objects or suspicious objects can be checked by the object detection unit, so that safe running of the train is guaranteed; and with conjunction of the 5G communication platform, the problems of high cost, low speed, exhaustion of workers or the like caused by traditional manual detection can be solved, and the passing speed of the baggage is increased.

Further, each in-station monitoring unit includes a surveillance camera, limiting modules and a warning module; the surveillance camera is in communication with the communication unit; the limiting modules are in communication connection with the warning module; the surveillance camera is configured to monitor the station and transmit the surveillance information to the central server through the communication unit; the central server analyzes the behaviors of people in the station; when people in the station have unsafe, uncivilized or illegal criminal behaviors, the central server sends an alarm control signal to the alarming unit through the communication device, and the alarming unit gives an alarm; the limiting modules are distributed at positions where solid handrails are inconvenient to arrange on the platform of the permanent-magnet maglev train and are configured to limit the positions of the passengers when the passengers are waiting for the train on the platform; and when the passengers get close to the limiting modules, the warning module will give a warning to remind the passengers of leaving away. The situations on the platform can be effectively monitored by the in-station monitoring unit. The limiting modules are flexible to use and convenient to arrange. Therefore, the passengers are prevented from waiting at unsafe positions.

Further, the surveillance camera may be one or two of a traditional fixed surveillance camera or an intelligent mobile surveillance camera; the traditional fixed surveillance camera is a wide-angle lens and can shoot a wide range; the intelligent mobile surveillance camera is variable in lens angle and focal length, and when the central server detects a dangerous behavior or a suspicious behavior of a passenger, the monitoring angle and distance of each intelligent mobile surveillance camera may be adjusted according to the position of each intelligent mobile surveillance camera, so that each intelligent mobile surveillance camera can be adaptively adjusted to an optimal monitoring state; in addition, different intelligent mobile surveillance cameras can be switched intelligently and realize dynamic tracing according to movement of the passengers.

Further, the permanent-magnet maglev rail transit control system based on the 5G communication technology further includes an Internet of Things monitoring system. The Internet of Things monitoring system includes a levitation height monitoring module, a running position monitoring module, a running speed monitoring module, a fire safety monitoring module and networking modules; the running speed monitoring module and the running position monitoring module are in communication with the 5G base stations through the corresponding networking modules; the levitation height monitoring module and the fire safety monitoring module are in communication connection with the WiFi transmission modules through the corresponding networking modules; the levitation height monitoring module, the running position monitoring module, the running speed monitoring module and the fire safety monitoring module are configured to monitor a levitation height, a running position, a running speed and a fire safety condition of the permanent-magnet maglev train respectively, and send the monitoring information to the central server through the corresponding networking modules; the central server stores the monitoring information in the data storage array through the data management unit and monitors whether the permanent-magnet maglev train runs normally or not in real time according to the levitation height, the running position, the running speed and the fire safety condition. The Internet of Things monitoring system transmits back the monitoring information in real time by means of the 5G network, so that the intelligent control center monitors the key information of running of the train in real time to guarantee stable running of the train.

It should be noted that there is more than one networking module in the Internet of Things monitoring system, and the networking modules are distributed according to the distribution of the Internet of Things monitoring system. Since the Internet of Things monitoring system monitors lots of parameters and there are varied situations, a single networking module cannot meet the networking requirement of the Internet of Things monitoring system. Therefore, there is a plurality of networking modules running in parallel so as to provide network connection for some corresponding modules in the Internet of Things monitoring system.

In the present embodiment, the Internet of Things monitoring system works under two conditions. Modules such as a running position detection module, a running speed detection module, which are not arranged in the train and do not need to move with the train, can be directly connected with the 5G base stations through the corresponding networking modules; and modules such as the levitation height monitoring module and the fire safety monitoring module, which are installed in the train, are provided with network services through the communication support unit (the WiFi transmission module(s)) in the train, in other words, the networking modules in the train are in communication with the train communication support unit so as to realize the purpose of connection with the 5G base stations.

Further, the permanent-magnet maglev rail transit control system based on the 5G communication technology further includes a passenger service system; the passenger service system includes a train service platform and a passenger service APP; the train service platform is mounted at each seat of the train and is in communication connection with the central server; the train service platform is configured to provide a human-computer interaction interface to provide train services for passengers; the passenger service APP is mounted in a mobile device of a passenger and provides online services such as online booking and arrival query of the train for the passenger; and meanwhile, when the in-station monitoring system monitors that a passenger has unsafe, uncivilized or illegal criminal behaviors on the platform, the central server will acquire the information of the passenger service APP of the passenger according to recognized face information of the passenger, and send a corresponding notice or warning information to the mobile device of the passenger to remind the passenger of stopping the current unsafe, uncivilized or illegal criminal behaviors.

The train services may include arrival reminding, self-service order, destination weather checking, charging service, control of air conditioning temperature or the like for passengers, and thus provide convenient and efficient experiences for the passengers.

Embodiment 2

Figure 2:
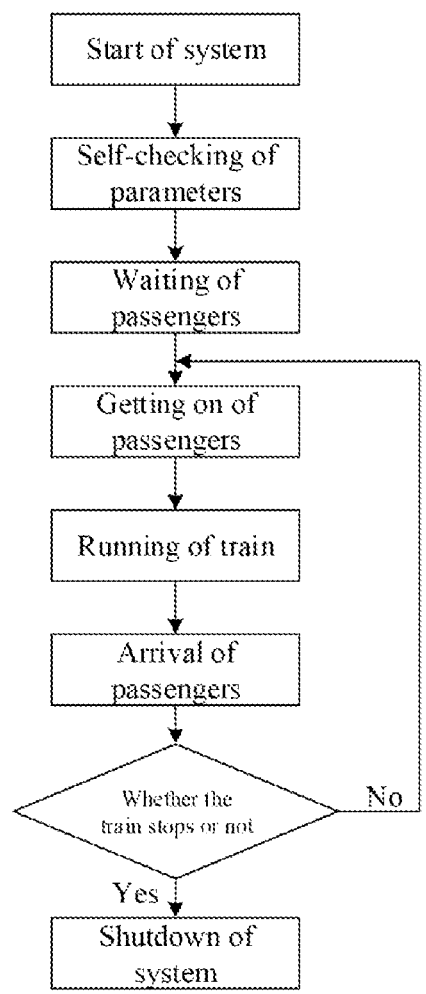
FIG. 2 is a flowchart of a method of Embodiment 2 of the present invention.

The present embodiment provides a method utilizing the permanent-magnet maglev rail transit control system based on the 5G communication technology. As shown in FIG. 2, the method includes the following steps:

after the permanent-magnet maglev rail transit control system based on the 5G communication technology is started normally, the electrical control system of the intelligent control center starts to drive the permanent-magnet maglev train to run according to an instruction of the central server; and in a 5G communication platform, the 5G base stations are connected to an external Ethernet to provide a wireless communication service; in the train communication support unit, the controller acquires the current running position of the permanent-magnet maglev train from the central server, controls the back-end communication module to be in communication connection with the current nearest 5G base station according to the current running position of the permanent-magnet maglev train and the installation positions of the 5G base stations, and controls the front-end communication module to be in communication connection with the next approaching 5G base station; when the permanent-magnet maglev train gradually leaves away from the nearest 5G base station and gets close to the next 5G base station, signals received by the back-end communication module gradually become weaker, while signals received by the front-end communication module gradually become stronger; when the controller detects that the signals received by the back-end communication module are weaker than that received by the front-end communication module, that is, the 5G base station connected with the front-end communication module becomes the current nearest 5G base station, the controller controls the back-end communication module to disconnect the communication connection from the original 5G base station and to be in communication connection with the 5G base station connected with the front-end communication module; when the controller monitors that the back-end communication module is in stable connection with the current nearest 5G base station, the front-end communication module is controlled to be disconnected from the current connected 5G base station and is controlled to be connected with the approaching 5G base station of the permanent-magnet maglev train according to the current running position of the permanent-magnet maglev train and the installation positions of the 5G base stations; and the WiFi transmission modules are in communication connection with the controller to transmit WiFi signals so as to provide wireless communication signals for passengers and equipment in the compartments.

Further, the method further includes the steps that: before the train runs, the train security system is used to conduct recognition and security check for passengers who are entering the platform and conduct security monitoring on behaviors of the passengers on the platform, wherein the face recognition unit acquires face information of the passengers and send the face information to the central server through the communication unit so as to realize real-time online face recognition, and the central server sends an instruction about whether the passengers are allowed to pass or not to the face recognition unit according to recognition results; the object detection unit detects the baggage and belongings of the passengers and transmits the detection information to the central server through the communication unit, and the central server identifies whether there are dangerous objects or suspicious objects or not; when the central server finds that there are dangerous objects or suspicious objects, the communication device sends an alarm control signal to the alarming unit, and the alarming unit gives an alarm; the in-station monitoring unit monitors the behaviors of people on the platform and sends the monitoring information to the central server through the communication unit, the central server judges whether there are unsafe, uncivilized or illegal criminal behaviors or not; and if so, the central server sends an alarm control signal to the alarming unit through the communication device, and the alarming unit gives an alarm.

Further, in the face recognition unit, a high-definition camera is configured to acquire face information of the passengers and transmit the face information to the central server in real time through the communication unit, and the central server extracts face features in real time; the central server compares the extracted face features with the face features, pre-stored in the data exchange device, of a passenger taking this train; if the extracted face features are match the pre-stored face features, the passenger is considered to have ordered the ticket of this train; the central server sends a pass instruction to the pass gate through the communication device; and the pass gate is opened after receiving the instruction to allow the passenger to pass. Further, in the object detection unit, the X-ray imager is used to detect the baggage of passengers and transmit the detected images to the central server through the communication unit; the central server extracts features from the detected images, picks the pre-stored features of dangerous objects or suspicious objects from the data storage array through the data management unit and compares the pre-stored features with the extracted features; when a dangerous object or a suspicious object is found, the central server sends an alarm control signal to the alarming unit through the communication device, and the alarming unit gives an alarm; when a passenger passes through the metal detecting gate, the metal detecting gate detects whether the passenger carries a metal object or not and transmits the information of the detected metal object to the central server, the central server picks the pre-stored information of dangerous objects and suspicious objects from the data storage array through the data management unit, and compares the pre-stored information with the information of the detected metal object; and when there is a dangerous object or a suspicious object, the central server sends an alarm control signal to the alarming unit through the communication device, and the alarming unit gives an alarm.

Further, in the in-station monitoring unit, a surveillance camera is used to monitor the platform and transmit the surveillance information to the central server through the communication unit; the central server analyzes the behaviors of people in the station; when people in the station have unsafe, uncivilized or illegal criminal behaviors, the central server sends an alarm control signal to the alarming unit through the communication device, and the alarming unit gives an alarm; the limiting modules are distributed at positions where solid handrails are inconvenient to arrange on the platform of the permanent-magnet maglev train; when passengers get close to the limiting modules, the warning module will warn the approaching passengers to remind them of leaving away.

Further, the method further includes: during running of the train, the Internet of Things monitoring system is used to monitor running parameters of the permanent-magnet maglev train; specifically, in the Internet of Things monitoring system, the levitation height monitoring module, the running position monitoring module, the running speed monitoring module and the fire safety monitoring module are configured to monitor the levitation height, the running position, the running speed and the fire safety condition of the permanent-magnet maglev train respectively, and send the monitoring information to the central server through the corresponding networking modules; the central server stores the monitoring information in the data storage array through the data management unit and monitors whether the permanent-magnet maglev train runs normally or not in real time according to the levitation height, the running position, the running speed and the fire safety condition.

Further, the method further includes: before the train runs or during running of the train, the passenger service system is used to provide services for passengers, wherein each seat of the train is provided with a train service platform, and the passengers select required train services through a human-computer interaction interface provided by the train service platform; the passenger service APP is mounted in mobile devices of the passengers, and the passengers are provided with required online services including online booking and arrival query of the train; and meanwhile, when the in-station monitoring system monitors that a passenger has unsafe, uncivilized or illegal criminal behaviors on the platform, the central server may acquire the information of the passenger service APP of the passenger according to recognized face information of the passenger, send a corresponding notice or warning information to the mobile device of the passenger, and remind the passenger of stopping the current unsafe, uncivilized or illegal criminal behaviors.

Figure 3:
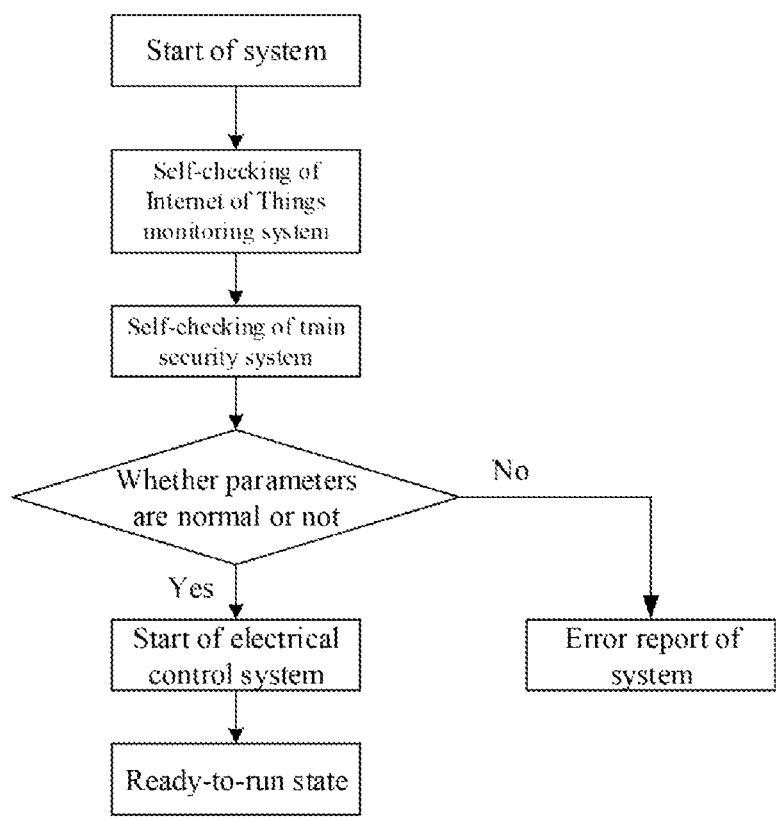
FIG. 3 is a flowchart illustrating self-checking of parameters in Embodiment 2 of the present invention.

Further, after being started normally, the permanent-magnet maglev rail transit control system based on the 5G communication technology firstly conducts self-checking of the parameters; as shown in FIG. 3, the Internet of Things monitoring system is configured to acquire data, mainly including that: the levitation height monitoring module acquires the levitation height data of the permanent-magnet maglev train; the running position monitoring module acquires the position data of the train; the train speed monitoring module monitors the speed of the train; and the fire safety monitoring module monitors the fire safety information of the permanent-magnet maglev rail transit control system. The Internet of Things monitoring system uploads data acquired by other modules of the system to the intelligent control center through the networking modules, and the data is processed by the central server. Meanwhile, the train security system is subjected to electrification detection, and each module of the train security system transmits the data back to the intelligent control center. When the central server judges that the Internet of Things monitoring system and the train security system are normal in parameters, a next step proceeds, otherwise, the system reports an error to be processed.

Various corresponding alterations and modifications can be made by those skilled in the art in accordance with the above technical solution and concept, and all of these alterations and modifications should be included within the protection scope of the claims of the present invention.

What is claimed is:

1. A permanent-magnet maglev rail transit control system based on a 5G communication technology, comprising an intelligent control center and a 5G communication platform, wherein the intelligent control center comprises an electrical control system, a data exchange device, a communication device and a central server; the electrical control system and the data exchange device is in communication connection with the central server; the central server is in communication connection with the communication device; the electrical control system is configured to drive a permanent-magnet maglev train to run according to instructions of the central server; the data exchange device comprises a data storage array, a data management unit and an input and output interface; the data storage array is used for data storage, and is connected with the data management unit through the input and output interface; the data management unit is in communication connection with the central server; the data management unit is configured to select corresponding data from the data storage array according to a request of the central server and transmit the corresponding data to the central server;

the 5G communication platform comprises a 5G base station and a train communication support unit; the 5G base station is arranged along a running route of the permanent-magnet maglev train; the train communication support unit comprises a front-end communication module, a back-end communication module, a controller and a WiFi transmission module; the front-end communication module, the back-end communication module and the WiFi transmission module are in communication connection with the controller; the controller is in communication connection with the central server; the front-end communication module and the back-end communication module are separately installed at a front end and a tail end of the permanent-magnet maglev train; each compartment of the permanent-magnet maglev train is provided with the WiFi transmission module; the communication device is in communication with the 5G base station; and the 5G base station is connected to an external Ethernet to provide a wireless communication service, and services such as installation of the 5G base station are provided by operators; in the train communication support unit, the controller is configured to acquire a current running position of the permanent-magnet maglev train from the central server, control the back-end communication module to be in communication connection with a current nearest 5G base station according to the current running position of the permanent-magnet maglev train and the installation position of the 5G base station, and control the front-end communication module to be in communication connection with a next approaching 5G base station; when the permanent-magnet maglev train gradually leaves away from the nearest 5G base station and gets close to the next 5G base station, signals received by the back-end communication module gradually become weaker, while signals received by the front-end communication module gradually become stronger; when the controller detects that the signals received by the back-end communication module are weaker than that received by the front-end communication module, that is, the 5G base station connected with the front-end communication module becomes the current nearest 5G base station, the controller controls the back-end communication module to disconnect the communication connection from the original 5G base station and to be in communication connection with the 5G base station connected with the front-end communication module; when the controller monitors that the back-end communication module is in stable connection with the current nearest 5G base station, the front-end communication module is controlled to be disconnected from the current connected 5G base station and is controlled to be connected with an approaching 5G base station of the permanent-magnet maglev train according to the current running position of the permanent-magnet maglev train and the installation position of the 5G base station; and the WiFi transmission module is in communication connection with the controller to transmit WiFi signals so as to provide a wireless communication signal for a passenger and equipment in each compartment, wherein the permanent-magnet maglev rail transit control system further comprises a train security system, wherein the train security system comprises a face recognition unit, an in-station monitoring unit, an object detection unit, a communication unit and an alarming unit; the face recognition unit, the in-station monitoring unit, the object detection unit and the alarming unit are in communication connection with the communication unit; the communication unit is in communication connection with the 5G base station; the face recognition unit is configured to acquire face information of the passenger and send the face information to the central server through the communication unit so as to realize real-time online face recognition, and the central server sends an instruction about whether the passenger is allowed to pass or not to the face recognition unit according to recognition results; the object detection unit is configured to detect baggage and belongings of the passenger and send detection information to the central server through the communication unit, and the central server identifies whether there are one or more specific objects or not; when the central server discovers that there are the one or more specific objects, the communication device sends an alarm control signal to the alarming unit, and the alarming unit gives an alarm; and the in-station monitoring unit is configured to monitor the behaviors of people on a platform and send monitoring information to the central server through the communication unit, the central server judges whether there are one or more specific behaviors or not, and if so, the central server sends an alarm control signal to the alarming unit through the communication device, and the alarming unit gives an alarm.

2. The permanent-magnet maglev rail transit control system based on the 5G communication technology according to claim 1, wherein the face recognition unit comprises a high-definition camera and a pass gate; the high-definition camera and the pass gate are both in communication connection with the communication unit; the high-definition camera is configured to acquire the face information of the passenger and send the face information to the central server in real time through the communication unit, and the central server extracts face features in real time; the central server compares the extracted face features with face features, pre-stored in the data exchange device, of the passenger taking this train; and if the extracted face features match the face features pre-stored in the data exchange device, the passenger is considered to have ordered the ticket of this train, then the central server sends a pass instruction to the pass gate through the communication device, and the pass gate is opened after receiving the pass instruction to allow the passenger to pass.

3. The permanent-magnet maglev rail transit control system based on the 5G communication technology according to claim 2, wherein the object detection unit comprises an X-ray imager and a metal detecting gate; the X-ray imager and the metal detecting gate are in communication connection with the communication unit, respectively; the X-ray imager is configured to detect the baggage of the passenger and transmit the detected images to the central server through the communication unit; the central server extracts features from the detected images, picks pre-stored features of the one or more specific objects from the data storage array through the data management unit and compares the pre-stored features with the extracted features; when the one or more specific objects are discovered, the central server sends an alarm control signal to the alarming unit through the communication device, and the alarming unit gives an alarm; when a passenger passes through the metal detecting gate, the metal detecting gate detects whether the passenger carries a metal object or not and transmits information of the detected metal object to the central server, the central server picks pre-stored information of the one or more specific objects from the data storage array through the data management unit and matches the pre-stored information with the information of the detected metal object; and when the one or more specific objects are discovered, the central server sends an alarm control signal to the alarming unit through the communication device, and the alarming unit gives an alarm.

4. The permanent-magnet maglev rail transit control system based on the 5G communication technology according to claim 3, wherein the in-station monitoring unit comprises a surveillance camera, a limiting module and a warning module; the surveillance camera is in communication with the communication unit; the limiting module is in communication connection with the warning module; the surveillance camera is configured to monitor the platform and transmit surveillance information to the central server through the communication unit; the central server analyzes the behaviors of people in the station; when people in the station have the one or more specific behaviors, the central server sends an alarm control signal to the alarming unit through the communication device, and the alarming unit gives an alarm; the limiting module is distributed at a position where a solid handrail is inconvenient to arrange on the platform of the permanent-magnet maglev train, and is configured to limit positions of the passenger when the passenger is waiting for the train on the platform; and when the passenger gets close to the limiting module, the warning module gives a warning to remind the passenger to leave.

5. The permanent-magnet maglev rail transit control system based on the 5G communication technology according to claim 4, further comprising a passenger service system, wherein the passenger service system comprises a train service platform and a passenger service APP; the train service platform is mounted on each seat of the train and is in communication connection with the central server; the train service platform is configured to provide a human-computer interaction interface to provide train services for the passenger; the passenger service APP is mounted in a mobile device of a passenger and provides online services for the passenger; and meanwhile, when the in-station monitoring system monitors that a passenger has the one or more specific behaviors on the platform, the central server acquires the information of the passenger service APP of the passenger according to recognized face information of the passenger, sends a corresponding notice or warning information to the mobile device of the passenger, and reminds the passenger to stop the one or more specific behaviors.

6. The permanent-magnet maglev rail transit control system based on the 5G communication technology according to claim 1, further comprising an Internet of Things monitoring system, wherein the Internet of Things monitoring system comprises a levitation height monitoring module, a running position monitoring module, a running speed monitoring module, a fire safety monitoring module and a networking module; the running speed monitoring module and the running position monitoring module are in communication with the 5G base station through the corresponding networking module; the levitation height monitoring module and the fire safety monitoring module are in communication with the WiFi transmission module through the corresponding networking module; the levitation height monitoring module, the running position monitoring module, the running speed monitoring module and the fire safety monitoring module are configured to monitor a levitation height, a running position, a running speed and a fire safety condition of the permanent-magnet maglev train respectively, and send monitoring information to the central server through the corresponding networking module; and the central server stores the monitoring information in the data storage array through the data management unit and monitors whether the permanent-magnet maglev train runs normally or not in real time according to the levitation height, the running position, the running speed and the fire safety condition.

7. A method utilizing the permanent-magnet maglev rail transit control system based on the 5G communication technology according to claim 1, comprising the following steps:
   after the permanent-magnet maglev rail transit control system based on the 5G communication technology is started, starting to drive a permanent-magnet maglev train to run according to an instruction of a central server by an electrical control system of an intelligent control center; and
   in a 5G communication platform, connecting a 5G base station to an external Ethernet to provide a wireless communication service; in a train communication support unit, by a controller, acquiring a current running position of the permanent-magnet maglev train from the central server, controlling a back-end communication module to be in communication connection with a nearest 5G base station according to the current running position of the permanent-magnet maglev train and an installation position of the 5G base station, and controlling a front-end communication module to be in communication connection with a next approaching 5G base station; when the permanent-magnet maglev train gradually leaves away from the nearest 5G base station and gets close to the next 5G base station, receiving gradually weaker signals by the back-end communication module, while receiving gradually stronger signals by the front-end communication module; when the controller detects that the signals received by the back-end communication module are weaker than that received by the front-end communication module, that is, the 5G base station connected with the front-end communication module becomes the current nearest 5G base station, by the controller, controlling the back-end communication module to disconnect the communication connection from the original 5G base station and controlling the back-end communication module to be in communication connection with the 5G base station connected with the front-end communication module; when the controller monitors that the back-end communication module is in stable connection with the current nearest 5G base station, controlling the front-end communication module to be disconnected from the current connected 5G base station and controlling the front-end communication module to be connected with the approaching 5G base station of the permanent-magnet maglev train according to the current running position of the permanent-magnet maglev train and the installation position of the 5G base station; and making the WiFi transmission module be in communication connection with the controller to transmit WiFi signals so as to provide a wireless communication signals for a passenger and equipment in each compartment, wherein the method further comprises:

before the train runs, by using a train security system, performing recognition and security check for passenger who is entering a platform and performing security monitoring on behaviors of the passenger on the platform; by a face recognition unit, acquiring face information of passenger and sending the face information to the central server through a communication unit so as to realize real-time online face recognition, and sending an instruction about whether the passenger are allowed to pass or not to the face recognition unit by the central server according to recognition results; by an object detection unit, detecting baggage and belongings of the passenger and transmitting detection information to the central server through the communication unit, and identifying whether there are one or more objects or not by the central server; when the central server discovers that there are the one or more specific objects, sending an alarm control signal to an alarming unit by the communication device, and giving an alarm by the alarming unit; by an in-station monitoring unit, monitoring behaviors of people on the platform and sending monitoring information to the central server through the communication unit, and judging whether there are one or more specific behaviors or not by the central server; and if so, by the central server, sending an alarm control signal to the alarming unit through the communication device, and giving an alarm by the alarming unit.

8. The method according to claim 7, further comprising:

during running of the train, monitoring running parameters of the permanent-magnet maglev train by using an Internet of Things monitoring system; specifically, in the Internet of Things monitoring system, by using a levitation height monitoring module, a running position monitoring module, a running speed monitoring module and a fire safety monitoring module, monitoring a levitation height, a running position, a running speed and a fire safety condition of the permanent-magnet maglev train respectively, and sending monitoring information to the central server through a corresponding networking module; by the central server, storing the monitoring information in a data storage array through a data management unit and monitoring whether the permanent-magnet maglev train runs normally or not in real time according to the levitation height, the running position, the running speed and the fire safety condition; and before the train runs or during running of the train, using a passenger service system to provide services for the passenger, wherein each seat of the train is provided with a train service platform, and the passenger selects required train services through a human-computer interaction interface provided by the train service platform; the passenger service APP is mounted in mobile devices of the passenger, and the passenger is provided with required online services including online booking and arrival query of the train; and meanwhile, when the in-station monitoring system monitors that a passenger has the one or more specific behaviors on the platform, the central server may acquire the information of the passenger service APP of the passenger according to recognized face information of the passenger, send a corresponding notice or warning information to the mobile device of the passenger, and remind the passenger to stop the one or more specific behaviors.

* * * * *